J. W. LEVER.
SEPARATING MECHANISM FOR COTTON SEED HULLERS.
APPLICATION FILED SEPT. 11, 1916.
1,252,273.
Patented Jan. 1, 1918.
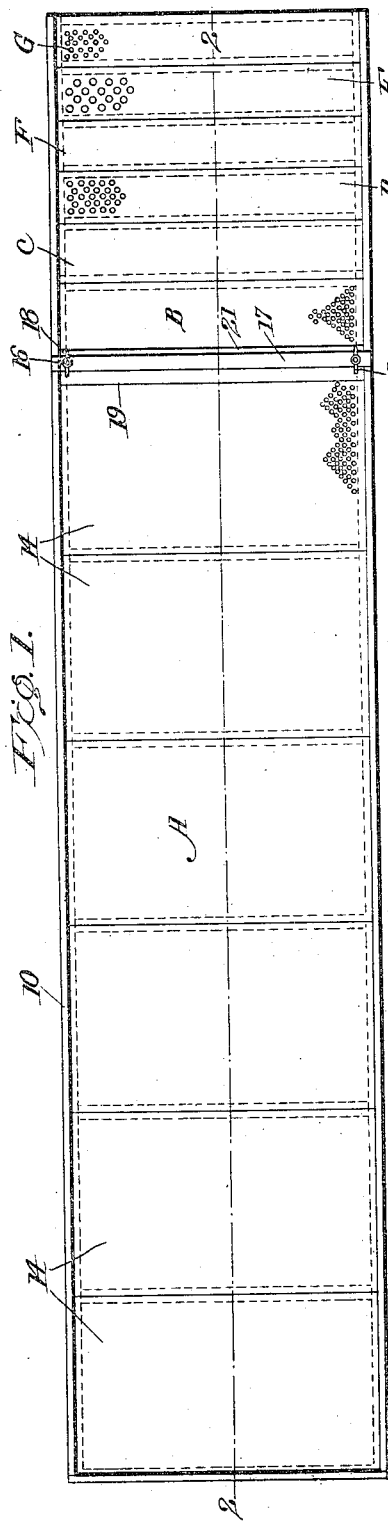
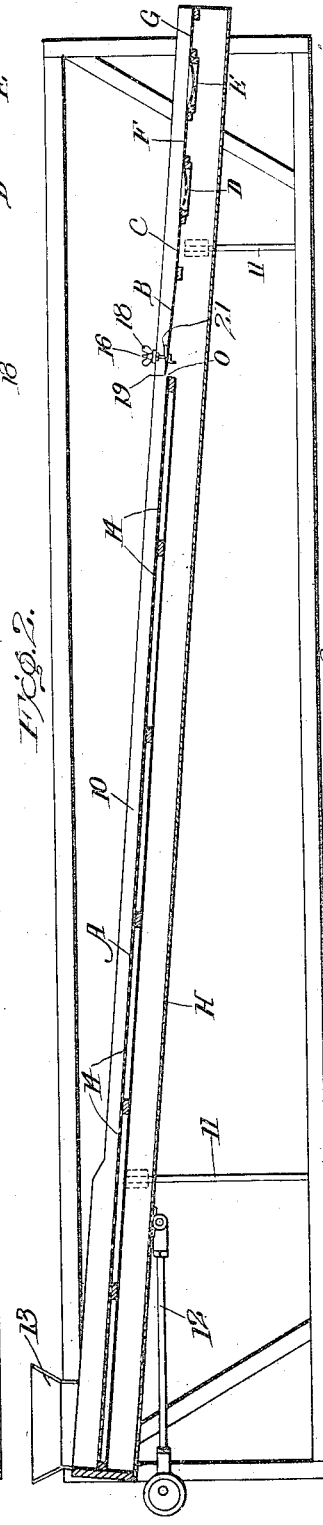
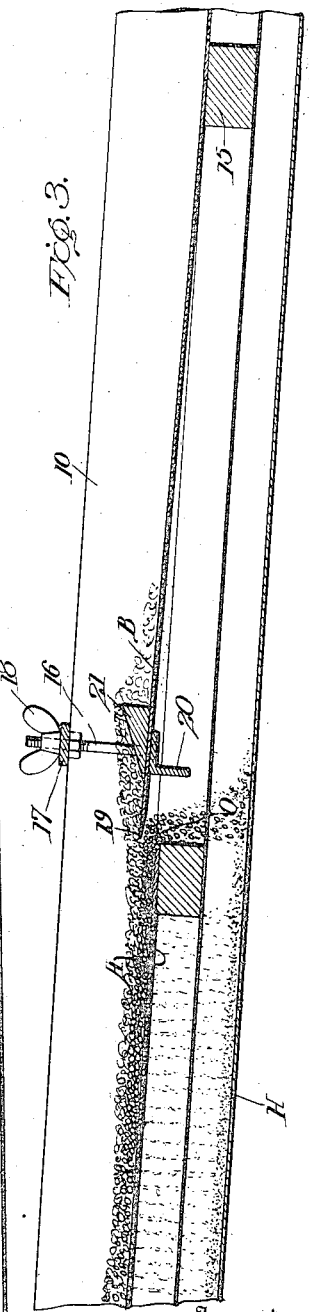
Inventor
John W. Lever
Attorney

UNITED STATES PATENT OFFICE.

JOHN W. LEVER, OF COLUMBIA, SOUTH CAROLINA.

SEPARATING MECHANISM FOR COTTON-SEED HULLERS.

1,252,273.

Specification of Letters Patent.

Patented Jan. 1, 1918.

Application filed September 11, 1916. Serial No. 119,567.

*To all whom it may concern:*

Be it known that I, JOHN W. LEVER, a citizen of the United States, and resident of Columbia, Richland county, State of South Carolina, have invented certain new and useful Improvements in Separating Mechanism for Cotton-Seed Hullers, of which the following is a specification.

My invention relates to a method and mechanism for separating hulls from a mixture of cotton seed hulls and meats as they come from cotton seed hullers.

Owing to the high price of linters recently, it has been the practice to lint the cotton seed as closely as possible, leaving the hulls practically bare and smooth without those adhering particles of lint ordinarily on them. Where coarse hulling is done and the ordinary separation process is applied to the closely delinted seed it has been found that it is practically impossible to maintain the ammonia or protein content of the meats, cake or meal up to the standard required by law. This is because too many of the smooth closely linted hulls pass through the shaker with the meats and this reduces the ammonia content and may bring it down below what the law permits. The passage of too many hulls from the shaker with the meat might be prevented by fine cutting in the huller and the use of fine perforations in the separating screen but this would result in too much loss of meats since the fine particles of meats would adhere to and go off with the hulls.

Coarse cutting or coarse hulling, as is well known, is the best to prevent loss of meats or what is known as separation loss, but with the present closely linted seed this is impossible without permitting too many hulls to pass through the large openings in the shaker screen left for the passage of the large meats resulting from coarse hulling. The attempt has been made to prevent the hulls from passing through with the meats by resorting to fine hulling and the use of small perforations in the separator so as to prevent the hulls from passing through the separator but as above stated this fine hulling results in considerably more separation loss due to fine particles and dust or meats adhering to and going off with the hulls.

By my invention I am enabled to do coarse hulling thus saving in separation loss and at the same time to maintain the ammonia and protein content of the meats, cake and meal by preventing too many hulls from going through with the meats.

In order to carry out the foregoing and other objects, I have devised a separating apparatus, the operation of which will be apparent from a description of the accompanying drawing, in which:—

Figure 1 is a plan view of a separating mechanism embodying my invention;

Fig. 2 is a longitudinal vertical sectional view of the same taken on the line 2—2 of Fig. 1; and Fig. 3 is an enlarged detail view of a part of the separating mechanism.

Referring to the drawing, the frame 10 of the shaker is supported by upright standards 11 which are yieldable to permit the agitating device 12 to shake the frame. The agitating device 12 is connected at one end of the frame 10 and at its other end it has an eccentric which gives the desired back and forth throw to the frame 10. The frame 10 is supported in an inclined position so that when it is agitated the material deposited onto it through the hopper 13 at the upper end will gradually travel downwardly toward the lower end of the frame.

Extending from the upper end of the frame downwardly to a point about two-thirds the distance to the lower end, the frame 10 carries a screen A which consists of a plurality of perforated metal plates 14, the perforations being approximately one-eighth inch size in the screen shown, although this dimension may be varied under different conditions. Beyond the lower end of the screen A there is an adjustable blade B which is fastened at its lower end to a cross piece 15 of the frame 10 and at its upper end it is carried by a pair of bolts 16 hung from a cross bar 17 and provided with wing nuts 18 for adjusting the free end of the blade B. The blade B has an upper edge 19 which tapers to a point at the upper end and the space between the edge 19 and the lower end of the screen A provides an outlet opening O through which meats and some hulls may pass. A stiffening angle bar 20 extends across the under side of the blade B and the heads of the blades 16 are fastened therein. An inclined retard block 21 is mounted on the upper side of the blade B above the stiffening bar 20 and has its narrow end directed upwardly and located a distance below the upper edge 19 of the blade B.

Below the blade B there is a perforated metal plate C and below the plate C are two removable pocket frames D and E spaced apart by a perforated metal plate F and below the lower pocket frame E there is another perforated metal plate G.

The pocket frames D and E carry concave perforated metal plates, the upper plate D having perforations therein which are about three-sixteenths inch size in the present mechanism and the lower concave plate E has perforations therein which are about seven-thirty-seconds inch size in this mechanism. The frame 10 carries a solid metal bottom H which covers the entire lower side thereof and is substantially parallel to the separating devices above it so that the meats and such hulls as pass through the perforations and opening O will travel downwardly and be delivered at the lower end into suitable conveying or other means to receive it (not shown). The hulls tailing off the lower edge of the plate G are also delivered to suitable conveying means (not shown).

The operation of the device and the method of separating hulls from the mixture of hulls and meats will be described. The mixture of hulls and meats is discharged from the cotton seed or other huller into the hopper 13 and from there delivered onto the upper end of the screen A. As the frame and the materials thereon are agitated the kernels or meats of the seed being the heavier will work to the bottom of the mixture while the hulls, being the lighter, will remain on top of the meats. By the time the mixture reaches the opening O it has thus been stratified into two layers, the lower layer consisting mostly of meats and the upper layer consisting mostly of hulls. The agitation of the frame also causes the finer meats and some hulls to pass through the screen A onto the bottom H while the mixture is traveling down the screen to the opening O. The smaller meats are thus first separated out by the screen A.

As illustrated in Fig. 3 when the stratified hulls and meats reach the lower end of the screen A, a part or all of the upper layer of hulls is skimmed off by the edge 19 of the blade B and the large meats and some hulls pass through the opening O onto the bottom H. The block 21 is not essential to the operation of the separating mechanism but I have found it to be useful as it retards the stream of hulls and meats and allows such kernels or meats which have not found the bottom of the mixture to further settle so that they will pass out through the opening O under the edge 19. The hulls pass over the upper edge of the block 21 and continue downwardly over the lower end of the blade B and screen C to the pockets or depressions D and E. Any small meats which have passed over the block 21 with the hulls will pass through the perforations in the part of the blade B below the block 21 or through the perforations in the plate C. Any large meats which pass over the block 21 will be caught in the depressions D and E and pass through the perforations in the bottoms thereof and some but not many hulls will also pass through these perforations.

Separating mechanisms formerly used were provided with large perforations at the upper end for large meats and smaller perforations in subsequent parts for smaller meats but in the present construction the smaller meats and fine particles of hulls are separated out first and the larger meats are separated later. By simply turning the thumb screws 18 the amount of hulls going through the opening O may be regulated and it is therefore unnecessary to change any of the separating screens to control exactly the amount of hulls mixed with the meats and the ammonia and protein content of the meal derived when the meats have passed through the press.

The method of separating the hulls from the meats and the mechanism for accomplishing such a separation is adapted for the separation of cotton seed hulls from the meats as well as other substances of a similar character, such as linseed, peanuts, and so forth. The device can also be used on the usual material coming from the huller or on the mixture of meats and hulls resulting from ordinary separation, since it will take out some of the hulls remaining in such a mixture.

While I have shown and described the invention in detail, I do not wish to be limited to the exact form of construction shown, as it will be obvious that modifications may be resorted to without departing from the spirit of the invention.

Having thus described the invention, what is claimed and desired to be secured by Letters Patent is:

1. In a mechanism for separating hulls from a mixture of hulls and meats, the combination of an inclined screen having a meats outlet extending transversely thereof and located intermediate the ends of the screen, said screen having small openings in its bottom above said outlet and also having concave screens below said outlet and provided with holes larger than said small openings, a blade adjustable toward and away from the edge of said outlet so as to regulate the amount of hulls passing through said outlet with the meats, and means for shaking said screen.

2. In a mechanism for separating cotton seed hulls from a mixture of hulls and meats and also for controlling the ammonia and protein content of the meal made from the meats, the combination of an inclined screen having a transversely extending meats outlet intermediate its ends, the portion of said screen above said outlet having small perforations for the passage therethrough of small meats, a blade adjustable with respect to the edge of said outlet to regulate its size and the amount of hulls passing therethrough with the large meats, a retarding device mounted below the edge of said blade, and means for shaking said screen.

In testimony whereof I affix my signature.

JOHN W. LEVER.